Dec. 28, 1948.  R. S. KIDD  2,457,311
STARTING AND GENERATOR-DRIVING MECHANISM FOR ENGINES
Filed Jan. 19, 1945  2 Sheets-Sheet 1
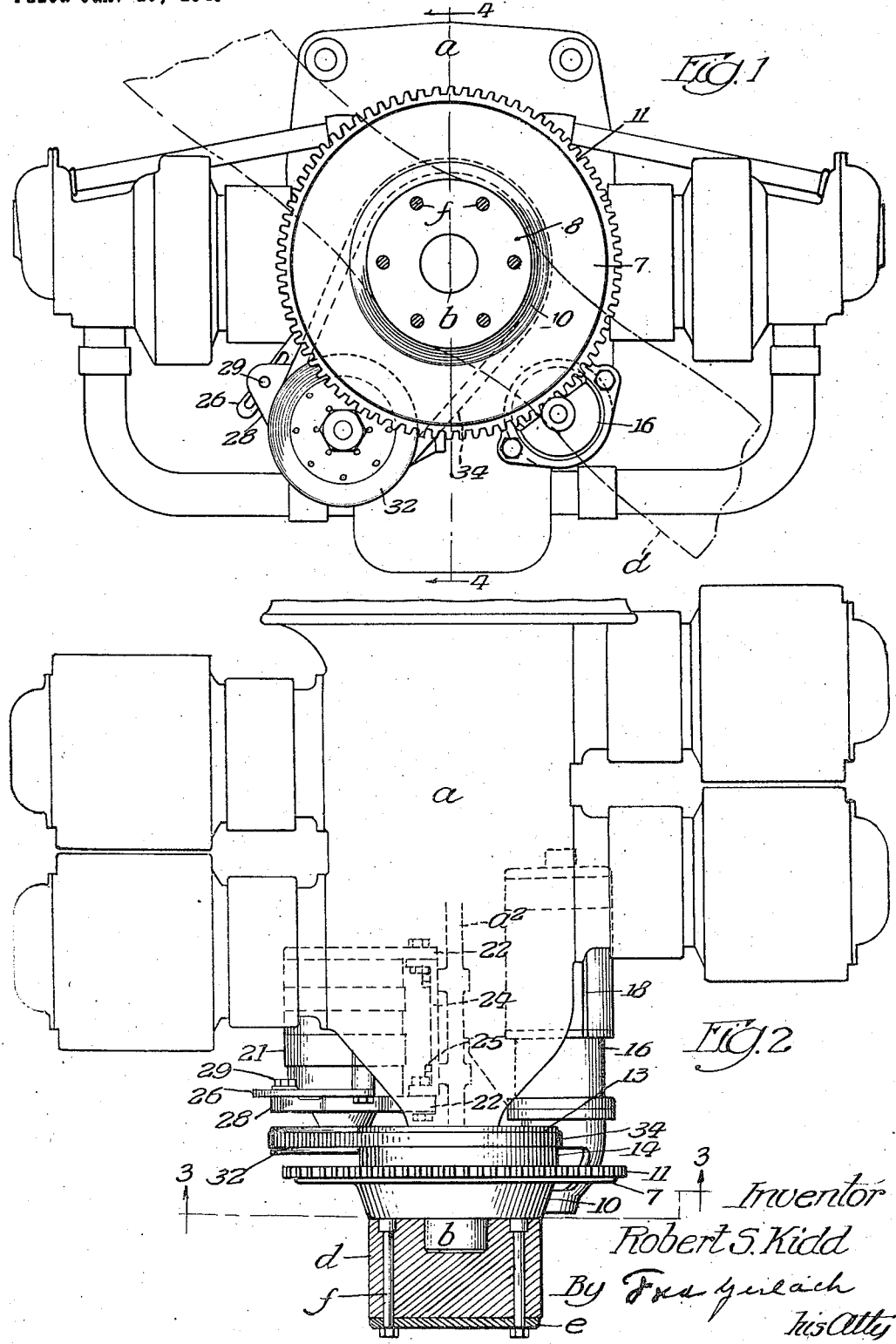
Inventor
Robert S. Kidd
By Jas Gerlach
his Atty

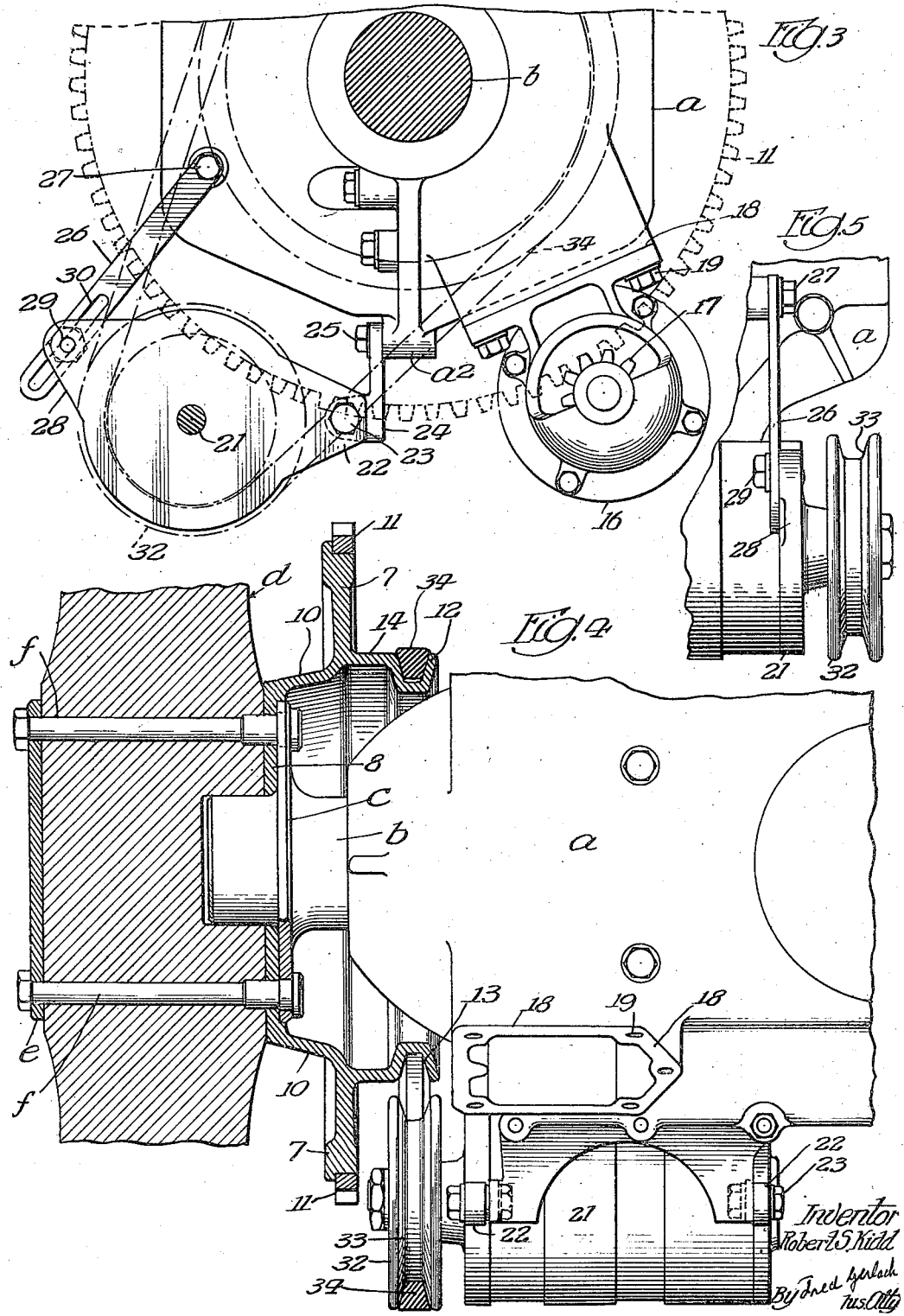

Patented Dec. 28, 1948

2,457,311

UNITED STATES PATENT OFFICE 2,457,311

STARTING AND GENERATOR-DRIVING MECHANISM FOR ENGINES

Robert S. Kidd, Williamsport, Pa., assignor to Avco Manufacturing Corporation, a corporation of Delaware Application January 19, 1945, Serial No. 573,529

4 Claims. (Cl. 170—135.75)

The invention relates to starters and generator drives for engines.

The objects of the invention are to provide: a simple unit which is adapted to be demountably applied to an engine and an aircraft propeller and includes a starter-gear and a generator drive wheel; equipment of this character which is adapted to be installed on the engine and the propeller; equipment of this character which is demountable from the engine and does not require any disassembling of the engine when repair or replacement of the equipment is desired; a simple unit which comprises a combined starter gear and a generator-drive wheel which may be readily applied to the propeller and engine shaft of conventional construction; and a light-weight unit which can be secured in the available space between an aircraft propeller and the engine; and other objects which will appear from the detailed description.

The invention consists in the several features hereinafter set forth and more particularly defined by claims at the conclusion hereof.

The invention consists in drawings:

Fig. 1 is a front elevation, with the propeller removed.

Fig. 2 is a plan of an engine equipped with the improved starter and electric generator drive; the propeller being shown in section.

Fig. 3 is a transverse section taken on line 3—3 of Fig. 2.

Fig. 4 is a longitudinal section taken on line 4—4 of Fig. 1; the engine being shown in elevation.

Fig. 5 is a detail of the device for movably supporting the electric generator on the engine casing.

The invention is exemplified with an internal combustion engine $a$ of the opposed cylinder type which may be of conventional or usual construction, and includes a crank-shaft $b$, the front end of which projects from the nose of the engine casing and is provided with an integral flange $c$; a propeller $d$ which is driven by the crank shaft $b$; a front plate or clamping flange $e$ on shaft $b$ and bolts $f$ which are adapted to secure the propeller to the flange $c$. The front end of the shaft $b$ fits into a socket formed in the propeller.

A starter gear and generator drive-wheel are combined in a unit which is adapted to be installed on the shaft $b$. This unit comprises a flat hub-portion 8 which has an opening to receive the front end of shaft and is adapted to be inserted and clamped between flange $c$ and the propeller, and by bolts $f$ which extend through flange $c$, hub portion 8, propeller $d$ and clamping plate $e$. This unit also comprises a gear-wheel body 7, rearwardly off-set from hub portion 8 and integrally joined thereto by an annular conical portion 10 and a gear ring 11 of wear-metal, shrunk or otherwise suitably joined to the rim of gear-body 7, and a generator-drive wheel 12, rearwardly off-set from and joined to gear-body 7, by an integral cylindrical portion 14. The securing of the hub-body 8 between flange $c$ and the propeller and rearward off-setting gear-body 7 and wheel 12 make it possible to install the starter-gear and generator drive-wheel in the space available, or without increasing the space, between the nose of the engine-casing and the propeller. The rearwardly off-set portion of the unit extends around the nose of the casing and the portion of the shaft between the casing and the flange, and provides sufficient clearance for the operation of the unit. The clamping of the hub-portion 8 of the unit makes it possible to install the unit on the shaft, without removing the shaft from the engine or taking apart the engine casing.

For assembling the starter-gear and generator-drive wheel unit with shaft $e$ and the engine, the propeller is removed from said shaft and the unit is slipped over the front-end of shaft $b$ with the back-face of hub portion 8 against flange $c$ on the crank shaft. The propeller is then replaced on shaft $b$ and bolts $f$ are passed through flange $c$, hub portion 8, propeller $d$ and clamping plate $e$, whereupon the unit will be operatively related to the engine, and the combined gear and wheel will be coaxially and demountably secured on the crank shaft.

An electric starter 16 is of conventional construction and comprises a pinion 17 which is adapted to be shifted in to mesh with the teeth of gear 11 and to be automatically disengaged therefrom when the engine and propeller have been started, as well understood in the art, is secured to a pad 18 of suitable contour. The pad 18 is integrally formed with the engine-casing and the casing of the starter 16 which has a base which fits on and is secured by screws 19 to said pad. The starter extends longitudinally of, and is positioned beneath and at one side of, the engine casing where it is easily accessible for installation, replacement or repair. This exemplifies a starter which is adapted to drive the starter gear 11 which is demountably secured on the crank-shaft $b$ between the propeller and the engine-casing.

An electric generator 21, operable from wheel 12 and of conventional construction, is demountably and adjustably supported below and at the one side of engine-casing. The casing of the generator is provided with lugs 22 which are connected by bolts 23 to a plate or bracket 24 which is secured by screws 25 to a web a—2 on the engine-casing. The generator 21 is supported by a link 26 for pivotal adjustment around bolts 23. The upper end of link 26 is pivoted at 27 to the engine-casing and its lower end is connected to a lug 28 on the generator-casing by a bolt 29 which extends through a slot 30 in the link. A belt-pulley 32 is secured to the generator shaft and is provided with a V-groove 33. A V-belt 34 fits in the grooves of the generator-drive wheel 12 and the pulley 32 on the generator shaft. By adjustment of the generator in slot 30 of link 29, the generator may be set to keep the belt 34 taut or in driving relation with sheaves or wheels 12 and 32. This exemplifies a generator which is demountable from the engine, adjustable to keep the driving belt taut, and may be readily installed on and removed from the engine for repair or replacement, which is driven by the sheave 12 which is demountably secured on the crank-shaft of the engine between a flange on said shaft and the propeller, and which includes a ring 11 which is combined with the starter-gear 17.

In aircraft of some types, it is desirable to provide an engine and propeller which may be equipped with a starter and generator-drive at the option of the purchaser or which may be installed on an engine and propeller of conventional construction. The invention provides a unit comprising a starter-gear and generator-drive wheel which may be applied to the engine without substantial change or without dismantling the engine. The pad 18 on the engine casing provides a mounting place for the starter, and the plate or bracket 24, for supporting the generator, may be secured to the engine casing by bolts 25. If the engine has been furnished without a starter and generator, the starter and generator may be readily added thereto, it being only necessary to remove the propeller d from shaft b and secure the off-set hub portion 8 of the starter-gear and generator-drive wheel unit in its operative position between the propeller and the nose of the engine and to secure the starter in place on pad 18 by bolt 19 and the generator 21 on the engine casing by means of bracket 24 and link 26, all of which may be done without dismantling the engine.

The invention exemplifies a starter-gear and generator drive-wheel unit which is demountably secured to the crank-shaft and in the available space between the propeller and the front end of the engine. The combining of the starter gear and generator drive-wheel into a unit simplifies their installation and removal, and requires no substantial changes in the construction of the engine, propeller and crank-shaft.

The invention is not to be understood as limited to the details described since these may be modified within the scope of the appended claims, without departing from the spirit and scope of the invention.

I claim:

1. The combination with an engine including a casing and a power output shaft; a propeller fixedly mounted on the outer end of said shaft; an engine starter mounted on the casing; an electric generator movably mounted on the casing: of a combined demountable unit secured to rotate with the shaft and the propeller, for driving the generator from the engine and driving the engine from the starter, the unit including a wheel for driving the generator and a gear engageable by the starter, said gear and wheel being both co-axial with the shaft and disposed between the propeller and the engine casing.

2. The combination with an engine including a casing and a power output shaft; a propeller fixedly mounted on the outer end of said shaft; an engine starter mounted on the casing; an electric generator movably mounted on the casing: of a combined demountable unit secured to rotate with the shaft and the propeller, for driving the generator from the engine and driving the engine from the starter, the unit including a wheel for driving the generator and a gear engageable by the starter, said gear and wheel being both co-axial with the shaft and disposed between the propeller and the engine casing, said wheel extending around an end-portion of the engine casing.

3. The combination with an engine including a casing and a power output shaft; a propeller fixedly mounted on the outer end of said shaft; an engine starter mounted on the casing; an electric generator movably mounted on the casing: of a combined demountable unit secured to rotate with the shaft and the propeller, for driving the generator from the engine and driving the engine from the starter, the unit being secured to the shaft and propeller, a gear having a body and a wheel for driving the generator integral with said hub, said wheel and body being both co-axial with the shaft and disposed between the propeller and the engine casing.

4. The combination with an engine including a casing and a power output shaft; a propeller fixedly mounted on the outer end of said shaft; an engine starter mounted on the casing; an electric generator movably mounted on the casing: of a combined demountable unit secured to rotate with the shaft and the propeller, for driving the generator from the engine and driving the engine from the starter, the unit including a single hub secured to the shaft and propeller, a gear having a body integral with the hub and a wheel for driving the generator integral with said hub, said wheel and body being both co-axial with the shaft and disposed between the propeller and the engine casing.

ROBERT S. KIDD.

REFERENCES CITED

The following references are of record in the file of this patent:

UNITED STATES PATENTS

| Number | Name | Date |
|---|---|---|
| 2,186,290 | Gordon et al | Jan. 9, 1940 |
| 2,310,081 | Hill | Feb. 2, 1943 |

FOREIGN PATENTS

| Number | Country | Date |
|---|---|---|
| 597,815 | France | Sept. 11, 1925 |